United States Patent
Duke, Jr. et al.

(10) Patent No.: US 8,357,065 B2
(45) Date of Patent: Jan. 22, 2013

(54) POWER TRANSMISSION BELT AND A PROCESS FOR ITS MANUFACTURE

(75) Inventors: Joseph Raleigh Duke, Jr., Elizabethtown, KY (US); Tao Yu, Louisville, CO (US)

(73) Assignee: The Gates Corporation, Denver, CO (US)

(*) Notice: Subject to any disclaimer, the term of this patent is extended or adjusted under 35 U.S.C. 154(b) by 1649 days.

(21) Appl. No.: 11/446,005

(22) Filed: Jun. 1, 2006

(65) Prior Publication Data

US 2008/0004145 A1      Jan. 3, 2008

(51) Int. Cl.
*F16G 1/28*          (2006.01)
(52) U.S. Cl. ........................................... 474/205
(58) Field of Classification Search .................... 474/205
See application file for complete search history.

(56) References Cited

U.S. PATENT DOCUMENTS

| | | | |
|---|---|---|---|
| 3,835,720 A | 9/1974 | Fisher et al. | |
| 3,964,328 A | 6/1976 | Redmond, Jr. | |
| 4,443,280 A | 4/1984 | Standley | |
| 6,296,588 B1 | 10/2001 | Ciemniecki et al. | |
| 6,358,171 B1 | 3/2002 | Whitfield | |
| 6,419,775 B1 | 7/2002 | Gibson et al. | |
| 6,613,503 B1* | 9/2003 | Isaac et al. | 430/523 |
| 2002/0179228 A1* | 12/2002 | Gibson et al. | 156/139 |
| 2007/0213446 A1* | 9/2007 | Feeney et al. | 524/445 |

FOREIGN PATENT DOCUMENTS

| | | |
|---|---|---|
| EP | 0 240 936 | 4/1987 |
| EP | 0 596 713 | 5/1994 |
| EP | 0 662 571 B1 | 12/1994 |
| EP | 1 035 353 A1 | 2/2000 |
| EP | 1 052 425 B1 | 5/2000 |
| EP | 1 154 171 A1 | 5/2001 |
| EP | 1 157 813 A1 | 5/2001 |
| GB | 2349113 | 10/2000 |
| WO | 96/02584 A1 | 2/1996 |
| WO | 00/63580 | 10/2000 |
| WO | 01/75330 | 10/2001 |

* cited by examiner

*Primary Examiner* — Michael Mansen
*Assistant Examiner* — Robert T Reese
(74) *Attorney, Agent, or Firm* — P. N. Dunlap, Esq.; J. A. Thurnau, Esq.

(57) ABSTRACT

An endless power transmission belt having a internal lubricating agent-containing fabric element extending along at least the pulley-engaging, power-transmitting surface of the belt, as well as processes for manufacturing same. More particularly, an endless toothed belt having a wear-resistant fabric cover element that comprises at least one internal lubricating agent in the form of one or more clusters within at least a portion of the total thickness of the fabric element.

8 Claims, 3 Drawing Sheets

POWER TRANSMISSION BELT AND A PROCESS FOR ITS MANUFACTURE

BACKGROUND OF THE INVENTION

The present invention relates to an endless belt having a power transmitting surface exhibiting high wear resistance, and more particularly to endless toothed belts having a fabric cover element intimately positioned along at least the outer surface of the tooth and land portions of the belt, and having a lubricating agent present within at least a portion of the fabric cover element, and optionally including a lubricating agent on at least a portion of the outer surface thereof, as well as to a method for producing such belts.

Endless belts, including V-belts, V-ribbed belts, and flat belting, as well as toothed belts such as synchronous- or timing belts and the like, are used in a variety of applications. Examples of power transmission belts, including toothed or synchronous belts, V-belts, and V-ribbed belts are disclosed in U.S. Pat. Nos. 3,138,962; 3,200,180; 4,330,287; and 4,332,576. Examples of methods for producing such belts are disclosed in U.S. Pat. No. 3,200,180 as indicated above and U.S. Pat. Nos. 3,772,929 and 4,066,732. These patent references are merely examples of various types of power transmission belts and known formation techniques thereof.

Toothed belts, generally comprising an elastomeric body portion, an essentially non-extensible reinforcing member and a plurality of driving teeth extending along the underside of the belt at a predetermined pitch, are put to particularly good use in high temperature, high speed and/or high load environments, including various industrial and automotive drive systems. In automotive applications, there is a growing demand for toothed belts that can perform successfully under increasingly high loads and at average operating temperatures of about 120° C. Operating temperature requirements for such applications are expected to reach 150° C. or greater in the near future.

Under such high load, high temperature and/or high-speed conditions, it is common for the teeth of endless toothed belts to deteriorate; the severe shearing stresses on the teeth often result in crack generation and tooth loss. A wear-resistant fabric cover element has been used over the tooth and land portions of such belts to shield the elastomeric teeth from such stresses. This modification alone however has not proved completely satisfactory in some particularly demanding applications. Upon extended high load or high-speed operation, such fabric covers tend to wear away, resulting in dimensional changes and/or premature belt failure. Moreover, there is a tendency in such constructions for the underlying belt elastomer to migrate through the weave of the fabric cover during the curing process and/or upon operation, and/or for the fabric cover to wear away with prolonged use, and to thus present some portion of the underlying belt elastomer at the belt's power transmitting surface. The presence of this relatively high coefficient of friction material at the belt's power transmitting surface results in high noise and frictional heat generation at the belt-sprocket interface upon operation of the belt. Noise generation is viewed as highly undesirable, and frictional heat generation and heat build-up reduce the life of the belt.

One proposed solution to the noise generation and/or frictional heat build up problems common in conventional belt operation has been to reduce the effective coefficient of friction of the power-transmitting surface of the belt. One such approach involves isolating or removing as much of the elastomer as possible from near the surface of the belt where that surface comes in contact with sprocket teeth. Such an approach is taken for example in U.S. Pat. No. 3,964,328, wherein the outer surface of a wear-resistant fabric covering is kept free of belt elastomer by the presence of a bonded layer of elastomer-impervious material adhered to such outer surface.

A second approach has been to incorporate a relatively pure polytetrafluoroethylene (PTFE) layer over the wear-resistant fabric cover element to decrease the effective coefficient of friction of the driving surface of the belt.

A third approach, disclosed in EP 1,052,425, directed moreover to improving the resistance of a belt's fiber cloth layer to wear, has involved applying a mixture including a resin adhesive ingredient, a rubber ingredient and a fluorine resin powder lubricant to both an exposed surface of such fiber layer and also to a second, opposed surface thereof, with fluorine resin powder being present at both the first and second fiber surfaces and between the fibers in the fiber layer between the first and second surfaces.

None of these approaches to the problems of abrasion or wear, noise and/or frictional heat generation in endless belt constructions is believed to be completely satisfactory, particularly in very high load applications. Where the belt surface remains free of belt elastomer by means of a relatively poor abrasion-resistant or low temperature laminate coating on the outer surface of a fabric cover element, high load or high temperature operation generally results in flaking off or melting of the coating, resulting in undesirable dimensional changes to the belt and poor tooth-sprocket fit, and hence increased belt noise. Moreover, as the coating layer diminishes, the fabric cover becomes exposed to the sprocket, ultimately leading to deterioration of such layer and exposure of the belt elastomer.

A substantially pure PTFE layer incorporated on the surface of a wear-resistant fabric cover element, while producing a reduced coefficient of friction at the driving surface similarly exhibits very poor wear resistance, and thus would likely wear off of the belt with use, again leaving the wear-resistant fabric layer exposed and presenting the concomitant problems associated therewith.

The incorporation of a mixture containing each of a rubber ingredient, a resin adhesive ingredient and a fluorine resin powder lubricant on both surfaces of and within a fiber layer of a power transmission belt is believed to be similarly insufficient. Application of such mixture onto a fiber layer surface according to the teachings of EP 1,052,425 is believed to result in deposition of a limited amount of actual lubricating specie at the power transmitting surface of the belt and within the fiber layer itself, since the lubricant is maintained within the belt composite structure in a space-occupying rubber/resin adhesive mixture. Moreover it is believed that the presence of the rubber and resin adhesive ingredients in the disclosed mixture would generally prevent lubricating specie within the fiber layer from reaching the power transmitting surface in order to contribute to the wear resistance thereof. In addition, since the fluorine resin powder lubricant is apparently dispersed homogenously in the rubber/resin ingredient binder and thus generally the same amount of the lubricating species would be found at the fiber layer-belt elastomer interface as at the opposite, power transmitting surface of the belt, it is anticipated that an undesirably high concentration of lubricating species may exist at or near the fiber layer-belt elastomer interface, having a potentially negative impact on adhesion of the fabric layer to the underlying belt body elastomer.

Thus, known endless belt constructions or processes for their manufacture have not effectively addressed the combined problems of belt noise, frictional heat generation, dimensional instability and durability.

SUMMARY OF THE INVENTION

The present invention provides in one embodiment a power transmission belt, such as a toothed belt, a flat belt, a V-belt or a multi-V-ribbed belt, having a generally flexible body portion and a fabric element extending along at least the wear-dependent, power transmitting surfaces of the belt, and having an internal lubricating agent within at least a portion of the total thickness of the fabric element wherein at least a portion of the internal lubricating agent is in the form of one or more clusters within the fabric element.

In a further embodiment of the present invention, a method for producing a power transmission belt is provided comprising the steps of applying to a fabric element a mixture comprising an internal lubricating agent and a carrier; and allowing at least a significant portion of the carrier to liberate, and at least a portion of the internal lubricating agent to form one or more clusters within at least a portion of the total thickness of the fabric cover element.

In yet another embodiment of the present invention, such method is provided further comprising the step of applying the mixture containing the internal lubricating agent in such a manner so as to effect a concentration gradient of internal lubricating agent within the fabric element, with a higher concentration of internal lubricating agent at a first surface of the fabric element defining the power transmitting surface of the belt, and a generally lower concentration thereof at least a point within the total thickness of the fabric element.

BRIEF DESCRIPTION OF THE DRAWINGS

The accompanying drawings, which are incorporated in and form a part of the specification, illustrate various embodiments of the invention, and together with the description, serve to explain principles of the invention. In the drawings, like numerals denote like parts, and.

DETAILED DESCRIPTION

Figure 1:
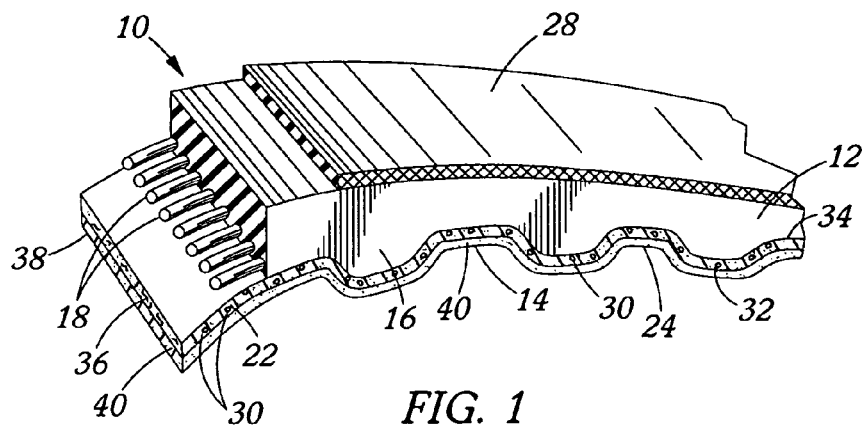
FIG. 1 is a cross-sectional, enlarged, perspective view of a toothed belt constructed in accordance with an embodiment of the present invention.

Referring to FIG. 1, an endless toothed power transmission belt 10 is shown generally. The belt includes a body having an overcord section 12 formed from a generally flexible material and a series of spaced cogs or teeth 16, also comprising a suitable generally flexible material alternating with land portions 14. The generally flexible material or materials utilized in the overcord section 12 and teeth 16 should generally be compatible with one another and may be of the same or of different types of material. Any suitable and/or conventional elastomer, including both castable and non-castable elastomers, may be used as the overcord 12 and/or the teeth 16 (hereafter collectively, "the belt body portions") in this embodiment of the present invention. Examples of suitable castable elastomers include but are not limited to castable polyurethanes (including polyurethanes, polyurethane/ureas and polyureas), plastisols, organosols, liquid chloroprenes, liquid polysulfides, liquid rubbers, silicones, epoxides, urethanes, polyester based resins, polyether based resins, and the like, as well as blends of any two or more thereof. Polyurethane elastomers are generally preferred over other types of castable elastomers at present because of their favorable tensile strength and abrasion resistance and their satisfactory modulus and elasticity. Such polyurethanes may be prepared in any conventional manner, such as by compounding a polyurethane prepolymer with a chain extending agent, and optionally an amount of plasticizer or other ingredient if desired. Conventional chain extenders may be utilized, which are generally known to the art.

Non-castable elastomers useful as the belt body portions of such belts that would likely enjoy the benefits provided by the present invention include for example, chloroprene rubber (CR), acrylonitrile butadiene rubber (NBR), hydrogenated NBR (HNBR), styrene-butadiene rubber (SBR), alkylated chlorosulfonated polyethylene (ACSM), epichlorohydrin, butadiene rubber (BR), polyisoprene (including both natural rubber (NR) and synthetic polyisoprene) and ethylene-alpha-olefin elastomers exemplified by ethylene propylene diene terpolymer elastomer (EPDM), as well as blends or mixtures of any two or more of the foregoing. Most thermoplastic elastomers are also envisioned within this context.

Whether a castable or non-castable elastomer is utilized in the compositions to form the elastomeric portion(s) of the belt, such compositions may also generally include conventional additives in amounts generally suitable for use in the intended application. Thus for example, such composition may also include a reinforcing, partially reinforcing or non-reinforcing filler in amounts of from about 0 parts per hundred weight of rubber (phr) to about 500 phr; alternatively of from about 20 phr to about 250 phr; one or more plasticizers in amounts of from about 0 phr to about 30 phr, or alternatively of from about 1 phr to about 25 phr; one or more vulcanization agents or curatives, including sulfur, free-radical-generating materials such as peroxide and ionizing radiation, etc., in cure-effective amounts of, e.g., from about 0 phr to about 30 phr for example; one or more co-agents or activators in amounts of from about 0 to about 100 phr; and one or more antidegradants in amounts of from about 0 phr to about 15 phr etc. In one embodiment of the present invention at least one of the overcord portion 12 and the teeth 16 of the belt 10 are formed of a suitable hydrogenated acrylonitrile butadiene rubber (HNBR) composition as set forth for example in U.S. Pat. No. 6,358,171, to Whiffield, the disclosure of which with regard to such elastomer compositions is hereby incorporated by reference; or a suitable polyurethane/urea composition such as that set forth for example in WO09602584 to Wu et al., the disclosure of which with regard to such elastomer compositions is hereby incorporated by reference.

The elastomer overcord section 12 is preferably provided with a reinforcing tensile layer or a plurality of tensile members, any number of which are well known to the art, such as the longitudinally extending and spaced tensile cords 18 as shown. These tensile cord 18 may consist of one or more strands of any suitable strain-resistant material including but not limited to polyamide cord, aramid cord, glass fiber cord, carbon fiber cord, polyester cord or filament wire cord, typically disposed as one or more embedded helically-wound cords as shown. The tensile members may be pre-stressed or impregnated or coated with a suitable adhesive or process-aid material as well known in the art, particularly where a non-castable elastomer such as HNBR is employed as or in the belt body portion.

The flexible materials forming the teeth 16 and/or overcord 12 portions may optionally be loaded with discontinuous fibers as is well known in the art, by the incorporation within the elastomer composition while generally in the un-vulcanized state of any suitable and/or conventional material including staple fiber, pulp fiber or chopped fiber reinforcement materials. Suitable materials for fiber loading include for example aramids, including meta- and para-aramids, such as those available by DuPont Chemical Co. under the trademark, KEVLAR; nylon, polyester and cotton. Fiber loading may be at any level suitable for the application, such as that disclosed in U.S. Pat. No. 6,358,171, the disclosure of which with regard to such fiber loading types and levels is hereby incorporated by reference; and may include in the case of toothed belts orientation of at least a substantial number of the fibers in a direction perpendicular to the travel of the belt. One or more such fibers may moreover protrude from the elastomeric material as is generally known.

A generally wear-resistant fabric layer, or fabric element 22 intimately fits along the power transmitting surface 24 of the belt 10, which is in the case of the toothed belt illustrated in FIG. 1, along at least the alternating teeth 16 and alternating land portions 14 of the belt 10 as shown, to form a cover therefor. The fabric utilized may be of any desired configuration such as a conventional weave consisting of warp and weft threads at any desired angle, including such weaves as twill-, square- or matte woven 1×1, −1×2, −1×3, −2×1, −2×2, −2×3, −3×1, −3×2, or −3×3 fabrics; or may comprise pick cords, or be of a knitted or braided configuration, or of a nonwoven configuration, or the like. More than one ply of fabric may be employed, including combinations of different types of fabrics. If desired, the fabric may be cut on a bias as is well known in the art so that the strands form an angle with the direction of travel of the belt. Conventional fabrics, including stretch fabrics, may be employed using such materials as cotton, polyester, polyamide, aromatic polyamide, hemp, jute, fiberglass and various other natural and synthetic fibers. In an embodiment of the invention, the fabric layer 22 comprises a bias-cut 2×2-twill or -matte woven fabric in which at least one of the warp or weft threads is formed of nylon 6,6, which may moreover be of a high tenacity variety. At least one of the warp or weft yarns may moreover be scoured, heat-set, texturized, twisted and/or otherwise processed as are each well known in the art. Optionally, the surface of the belt remote from its power transmitting surface may also include a fabric element as herein described, (hereafter, "backfabric") which back fabric 28 may be either of the same type and form as that utilized along the tooth 16 and land portions 14 of the belt 10, or of a different type or form.

In accordance with an embodiment of the present invention, at least the fabric cover element 22 extending along the power transmitting surface 24 of the belt 10 is provided with an internal lubricating agent 30, shown in exaggerated enlargement in FIG. 1 to illustrate its general location within a portion of the total thickness of the fabric element 22 according to this particular embodiment. Within the present context, the term "lubricating agent" is used to denote any material having the characteristic of reducing the effective coefficient of friction of a body to or upon which it is applied, and to thereby reduce the adverse effects of abrasion of such member with repetitive or prolonged interaction thereof with a second body. In the present context, the term "internal" is used to describe that lubricating agent of which at least a portion generally resides within another structure; in this case, within at least a portion of the total thickness of the fabric element. The internal lubricating agent residing within at least a portion of the total thickness of the fabric element 22 in accordance with an embodiment of the present invention serves to reduce the adverse impact of repetitive fiber-to-fiber interactions with prolonged utilization of the subject belts, and is also believed to serve as a reservoir for replenishing the power transmitting surface 24 of the belt 10 with lubricating agent with extended operation of the belt as further described below.

In the particular embodiment of the present invention illustrated in FIG. 1, at least some internal lubricating agent 30 is moreover present within at least a portion of the total thickness of the fabric cover element 22 in the form of at least one cluster 36. Within the present context, the term "cluster" is used to denote two or more particles grouped together but not necessarily bonded chemically or mechanically to one another to form at least a temporary lubricating agent-rich aggregate or domain. In the practice of an embodiment of the present invention described in further detail below with reference to FIG. 4, the presence of internal lubricating agent 30 in the form of one or more such clusters 36 within at least a portion of the total thickness of the fabric cover element 22 has been found to improve the wear resistance and frictional characteristics of the resultant belt compared to comparable belts lacking this cluster characteristic.

In an embodiment of the present invention penetration of internal lubricating agent 30 within the total thickness of the fabric element 22 is imbalanced, i.e., a relatively greater amount of lubricating agent 30 resides in that portion of the total thickness proximal the belt's power transmitting surface 24, and a lesser amount of internal lubricating agent 30 resides in that portion of the fabric element's total thickness proximal the underlying belt body portions. In a further embodiment of the present invention, at least a greater amount, i.e. greater than 50% by volume, of the internal lubricating agent 30 resides within approximately that half of the total thickness of the fabric element 22 nearest the belt's power transmitting surface 24, with the half of the fabric element 22 nearest the underlying elastomeric belt body portions having therein a generally lesser amount thereof. In yet another embodiment, at least a greater amount by of volume of the internal lubricating agent 30 employed resides within a portion of the fabric element 22 extending from about the first surface 32 of the fabric element proximal the belt's power transmitting surface to a point in the range of from approximately 50% to about 75% of the total thickness of the fabric element 22 as illustrated in FIG. 1.

As the internal lubricating agent 30, there may be mentioned any suitable and/or conventional relatively low coefficient of friction material such as any conventional or suitable fluoropolymer, graphite, molybdenum disulfide and/or ultra-high molecular weight polyethylene. Suitable fluoropolymers may include for example but are not limited to polytetrafluoroethylene polymer (PTFE), polytrifluoromonochloroethylene polymer (PTFCE), polyvinylidene fluoride polymer (PVDF), fluorinated ethylene polymer (FEP) and perfluoroalkoxy polymer (PFA).

In an embodiment of the present invention an amount of internal lubricating agent in the range of from about 5% to about 50% based on the dry weight of the greige (i.e., untreated) fabric is utilized upon and/or within the fabric cover element. In a further embodiment, an amount of internal lubricating agent in the range of from about 12% to about 40%; or alternatively of from about 15% to about 35%; based on the weight of greige fabric is so utilized. At dry pick-up levels lower than these, it is believed that adequate fabric lubrication is impeded resulting in reduced wear resistance. At higher dry pick-up levels undesirably high accumulation of internal lubricating agent at the very surface of the fabric cover element generally results particularly when utilizing standard knife-coating techniques, as described for example in further detail below.

In the practice of an embodiment the present invention employing a 2×2 twill or matte nylon 6,6 fabric cover element having a density in the range of about 340 to 390 g/m2, or of about 365 g/m$^2$; a thickness in the range of about 0.99 to about 1.15 mm, or of about 1.07 mm; and a yarn construction of about 235/1 dtex (210/1 denier) in the warp and about 78/6 dtex (70/6 denier) in the fill; and a yarn count in the range of about 70 to 80 per 25 mm in the warp and of about 68 to 72 per 25 mm in the weft, or of about 75/25 mm in the warp and about 70/25 mm in the weft, it has been found that internal lubricating agent having an average particle size greater than 225 nm; or alternatively in the range of from about 500 nm to about 100 μm; or alternatively in the range of from about 1 μm to about 50 μm; or alternatively in the range of from about 2 μm to about 10 μm may be employed with beneficial results. When the average particle size of the internal lubricating agent utilized for this particular fabric was only 225 nm, reduced wear resistance resulted. It is believed that this is due to a greater tendency of such relatively small particle sized material to become dispersed in subsequently applied fabric treatments (e.g., adhesive and or other treatment as further described below), particularly within a fabric element of the above-described dimensions; or, in the case of castable elastomer belt body portions such as those based on polyurethane/urea, to become dispersed in the belt body elastomer itself during the belt building process, and hence to have a reduced tendency to form one or more beneficial, generally mobile clusters within the fabric element as described further below. Conversely, when the average particle size exceeds 100 μm particularly for such above-described fabric construction, adequate penetration of a sufficient amount of internal lubricating agent within the total thickness of a fabric cover element incorporating conventional fabric weaves is believed to be impeded. One of ordinary skill in the relevant art would readily appreciate however that the appropriate dimensions for a fabric will vary dramatically with the intended final application and the corresponding belt's dimensions. The skilled practitioner could readily determine the corresponding fabric's thickness, density, yarn count and construction for any size belt and associated application, as well as the corresponding particle or cluster size in accordance with the description of the invention provided herein to arrive at the claimed combination.

In one embodiment of the present invention the internal lubricating agent may be applied to the fabric element as part of a mixture. Such mixture may comprise a carrier in addition to the lubricating agent. Within the present context, the term "carrier" is used to denote a material for providing the function of transporting or depositing a lubricating agent onto and/or into a second body; and which upon fulfillment of such function is capable of being or is allowed or caused to be substantially removed or liberated from such second body. In the case of utilization with the internal lubricating agent in accordance with an embodiment of the present invention, such carrier is used to transport the agent to within at least a portion of the total thickness of a fabric element, and is thereafter allowed to liberate therefrom. This is distinguishable from a material, such as certain resins or polymers, that is intended to remain along with a lubricating agent, either bonded or non-bonded thereto, as part of a composite upon and/or within a fabric element subsequent to the liberation of any carrier that may be employed in the application of such composite. In the interest of clarity, these materials of the type intended to remain with a lubricating agent within the belt composite structure will be referred to within the present disclosure as "binders".

As a carrier in the practice of an embodiment of the present invention, any suitable and/or conventional material having the ability to perform the function of serving as a vehicle for the deposition of internal lubricating agent to within the fabric element and moreover having the characteristic of allowing for its own substantial removal upon completion of such purpose may be utilized, including water, an organic and/or inorganic solvent, and a mixture of any two or more thereof.

In a further embodiment of the present invention, the internal lubricating agent is incorporated in a mixture further comprising a carrier, but with minor amounts (e.g., less than about 100% by weight based on the amount of carrier employed in the mixture); or in the substantial absence of a binder. It is presently believed that in accordance with this particular embodiment by minimizing the amount of or substantially eliminating a binder from the mixture bearing the internal lubricating agent during application of the lubricating agent to the fabric, a greater concentration of lubricating agent can be conveyed to within the fabric element itself, and the internal lubricating agent can more easily move throughout the fabric element to which it is applied particularly once the carrier is liberated to form and/or re-form one or more beneficial clusters within the fabric. Upon optional subsequent applications of fabric treatment (e.g., adhesive treatment and/or one or more outer rubber or resin layer or additional lubricant coating, or castable elastomer belt body portion molding processes), these generally mobile lubricant particles tend to re-group among themselves to form a plurality of highly concentrated clusters or clusters within the fabric element itself, and in some cases within a generally continuous phase formed by those subsequently applied adhesive, rubber and/or lubricant coating layers. In addition to reducing the adverse impact of fiber-to-fiber abrasion within the fabric element, these clusters are believed to eventually break or move apart from one another and/or to re-form with prolonged use of the article to serve as a source for providing continued fiber-to-fiber lubrication within the fabric element and for replenishing lubricating agent at the power transmitting surface of the belt with extended use.

Where desirable, further additives may be employed in the mixture comprising the carrier and the internal lubricating agent, such as one or more rheology-modifying agents as processing aid. Any suitable and/or conventional material may be utilized in any suitable and/or desirable quantity in this regard, including any of the various synthetic hydrophobically modified acrylate polymers exemplified by a material available from Rohm and Haas Company under the trademark ACUSOL. The mixture could furthermore optionally include a suitable or conventional wetting agent in suitable amounts for improving the incorporation of the lubricating agent in the water or other carrier.

When utilized in the practice of the present invention, any internal lubricating agent-containing mixture suitable for transporting an adequate amount of internal lubricating agent to within at least a portion of the total thickness of a fabric cover element may be employed. As a non-limiting example, such a mixture for beneficial utilization in treating through immersion the 2×2 nylon 6,6 twill or matte woven fabric described above and in further detail below may comprise for example 50% by weight of water and 50% by weight of a 21.5% solids dispersion (in water) of PTFE having an average particle size of about 5 μm available commercially from Micropowders, Inc. under the reference MICROSPERSION HT. In a further embodiment of the present invention whereby internal lubricating agent is applied to this same particular fabric type but beneficially by a knife coating process, a non-limiting beneficial mixture comprises in one embodiment about 58% water, 34.9% of the above-mentioned PTFE dispersion and about 7% of a rheology modifier available from Rohm and Haas Company under the reference ACUSOL S.

In the particular embodiment of the present invention illustrated in FIG. 1, at least a portion of the internal lubricating agent 30 within at least a portion of the total thickness of the fabric cover element 22 extending from a first surface 32 to a second surface 34 thereof, furthermore optionally forms a concentration gradient, or an imbalanced concentration of internal lubricating agent across at least a portion of the total thickness of the fabric cover element 22, with a higher concentration of internal lubricating agent 30 at a first surface 32 thereof proximal the power transmitting surface of the belt and a lower concentration of internal lubricating agent 30 at the opposite, second surface 34 of the fabric element 22 as shown. This particular embodiment of the invention provides a beneficially high concentration of internal lubricating agent proximal the power transmitting surface 24 of the belt 10, with a reduced amount of lubricating agent proximal the fabric element-belt elastomer interface that could otherwise interfere with proper adhesion at this interface.

Optionally, the fabric element 22 may moreover include an outer layer 38, as conventionally known, which may be formed of one or more suitable curable elastomers and/or resins optionally along with additional conventional rubber and/or resin additives. The outer layer may be applied as a solid film or may be dispersed in a solvent such as methyl ethyl ketone or the like as is well known in the art. This outer layer, which may be applied to the fabric element by any conventional or otherwise suitable process such as by dipping, roll-coating, reverse-roll-coating, knife-coating, spraying, calendering, or laminating, further contributes to the wear resistance of the belt as is known in the art. Moreover, since the internal lubricating agent within the fabric element in accordance with an embodiment of the present invention is at least temporarily generally mobile within the total thickness thereof, this outer layer 38 also serves as a barrier to prevent or restrict excessive amounts of internal lubricating agent from dispersing, being expelled from or prematurely reaching the power transmitting surface 24 with belt use.

In the formation of power transmission belts having castable elastomer belt body portions in particular, the utilization of an outer generally impermeable, elastomer-impervious layer on that surface 32 of the fabric element 22 facing the belt's power transmitting surface 24 is generally required in accordance with conventional belt building techniques, since in accordance with such techniques it is generally necessary to prevent penetration of the generally liquid castable elastomer through the fabric and to the power transmitting surface of the belt, as is generally known in the art and disclosed for example in U.S. Pat. No. 3,964,328.

As indicated above and in accordance with a further embodiment of the present invention, this outer layer 38 on and/or penetrated to within a portion of the first surface 32 of the fabric cover element may optionally include a second lubricating agent 40. While on the one hand, a chief function of the internal lubricating agent 30 is to reduce fiber-to-fiber wear within the fabric element, a primary function of this second, generally external lubricating agent 40 is to address the adverse impact of wear caused by belt-pulley interaction. Accordingly while one could utilize for this second lubricating agent 40 the same type and/or size agent utilized as that utilized as the internal lubricating agent 30, one could alternatively use any conventional or suitable lubricating agent as desired in any conventional or suitable form, e.g., one or more agents suspended, dispersed, cross-linked or otherwise borne within a carrier and/or a binder. Moreover, it has been found in accordance with an embodiment of the present invention that using a generally smaller particle size lubricating agent for this purpose, e.g. in the range of about 225 nm for the particular fabric construction described above in the accompanying examples, provides beneficial results as further described below.

In an embodiment of the present invention, the second, external lubricating agent 40 may be one or more selected from PTFE, molybdenum disulfide, graphite, ultrahigh molecular weight polyethylene or any other suitable and/or conventional lubricating agent as described with regard to the internal lubricating agent 30.

Optionally but generally in the case of non-castable elastomer belt body portions such as HNBR, the fabric element 22 may moreover include any suitable and/or conventional adhesive treatment on at least a second surface 34 thereof opposite the first surface 32 and optionally penetrated to within at least a portion of the total thickness thereof. Such adhesive treatment may for example be a non-crosslinked rubber-based system compatible with the fabric element and the underlying belt body portions, and may include a suitable rubber cement, skim or friction layer including an adhesive ingredient such as any suitable isocyanate, epoxy resin or phenol formaldehyde reaction product, etc. as is well known in the relevant art.

Figure 2:
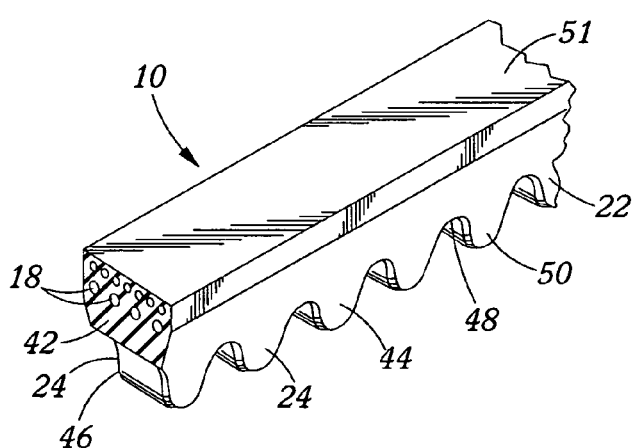
FIG. 2 is a cross-sectional, perspective view of a V-belt constructed in accordance with a further embodiment of the present invention.

Turning now to a description of an embodiment of the present invention illustrated in FIG. 2, a standard notched V-belt 10 is illustrated. The V-belt 10 includes a main elastomeric belt body portion 42 analogous to the belt body portion described for FIG. 1 and a tensile reinforcement member generally in the form of one or more cords 18 also analogous to that illustrated in FIG. 1. The main elastomer body portion 42 and the cord(s) 18 of the V-belt 10 may be constructed from the same or different materials as those described above for FIG. 1, but the particular type of elastomer employed in the body portion may be selected to exhibit alternative properties, e.g. with regard to durability and/or oil resistance, and the cord(s) 18 may be selected to generally exhibit some level of additional extensibility compared thereto depending generally on the belt's intended use as is well known in the art. The V-belt 10 also includes a power transmitting surface 24 as in the toothed belt of FIG. 1, but in this case in the form of a sheave contact portion having side surfaces 44, 46 for frictional engagement with a complementary sheave (not shown but conventional). In this illustrated embodiment the sheave contact portion is in the form of alternating notch depression surfaces or troughs 48 and toothed projections 50. These alternating notched depression surfaces 48 and tooth projections 50 may follow a generally sinusoidal path as illustrated, which serves to distribute and minimize bending stresses as the sheave contact portion passes around pulleys and sheaves. While in the embodiment of the present invention illustrated in FIG. 1 at least the power transmitting surface 24 of the belt 10 includes a fabric element 22, in the case of the V-belt 10, a fabric element 22 containing internal lubricating agent 30 as herein described could be utilized along any or all of the power transmitting surface 24 as shown, on the belt surface 51 opposed thereto, or generally about the entire periphery of the V-belt to form a banded- or wrapped V-belt, as would be the case with the corresponding placement of fabric elements of the prior art.

Figure 3:
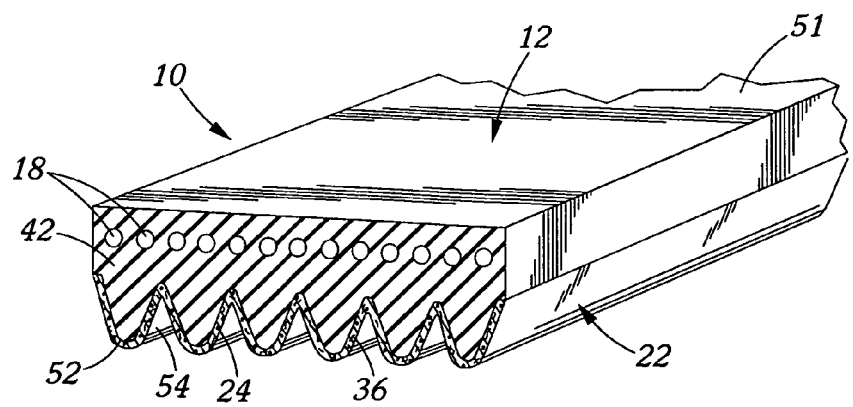
FIG. 3 is a cross-sectional, perspective view of a multi-v-ribbed belt constructed in accordance with yet another embodiment of the present invention.

Turning now to a description of an embodiment of the present invention illustrated in FIG. 3, a multi-V-ribbed belt 10 is illustrated. The multi-V-ribbed belt 10 includes a main elastomeric belt body portion 42 as in the belts of FIGS. 1 and 2 and also includes a tensile reinforcement member generally in the form of one or more cords 18 also as previously described. The main elastomer body portion 42 and the cord(s) 18 of the multi-V-ribbed belt 10 may be constructed of the same or different materials as those described above for FIG. 1, but the particular type of elastomer employed in the body portion may be selected to exhibit alternative properties, e.g. with regard to durability and/or oil resistance, and the cord(s) 18 may be selected to generally exhibit some level of additional extensibility compared thereto for a given intended application as is known in the art. A plurality of raised areas or apexes 52 alternating with a plurality of trough areas 54 define therebetween oppositely facing sides that serve as power transmitting surfaces 24 of the belt 10. While in the embodiment of the present invention illustrated in FIG. 1 at least the power transmitting surface 24 of the belt 10 includes a fabric element 22, in the case of the multi-V-ribbed belt 10, a fabric element 22 containing internal lubricating agent as herein described could be utilized on any or all of the power transmitting surface 24 as shown and on the belt surface 51 opposite thereto, as is well known. For each of the embodiments of FIGS. 2 and 3, the fabric element 22 would include an internal lubricating agent 30 as described above with regard to FIG. 1.

The novel use of an internal lubricating agent according to one embodiment of the present invention, whereby the internal lubricating agent forms one or more lubricant-rich domains or clusters within the fabric element, overcomes shortcomings of the prior art by providing a finished endless belt that exhibits minimal noise, that retains substantial dimensional stability for the life of the belt, that exhibits improved wear- or abrasion-resistance properties, that minimizes frictional heat generation during operation of the belt, and that provides these beneficial characteristics with the possibility of substantially reducing or eliminating environmentally unfavorable solvents used in conventional constructions. It is believed that in addition to possessing additional mobility with which to promote fiber-to-fiber lubrication within the fabric element, with increased wear and/or prolonged use such lubricant-rich domains or clusters 36 as seen clearly in FIG. 4, generally break apart with continued belt use, generally replenishing or renewing the belt's power transmitting surface 24 with lubricating agent 30.

The use of a lubricating agent concentration gradient or imbalanced penetration within the fabric layer in accordance with further embodiment of the present invention, wherein a substantial portion of lubricating agent clusters resides in a portion of the fabric element nearer the belt's power transmitting surface, and optionally resides in less than the entire thickness of a fabric element, overcomes shortcomings of the prior art by providing an endless belt that exhibits improved adhesion between the fabric layer and the underlying belt body elastomer portions, and also optimizes the amount of lubricating agent that resides within the fabric element, i.e., within interstices of the fabric formed by the voids created between individual yarns- and/or fibers thereof.

The present invention contemplates a process for the production of a power transmission belt of the type described above. It is characterized in that a fabric element is treated for example by immersion, spraying, roll-coating, knife-coating, or through any other suitable and/or conventional method, with an internal lubricating agent whereby at least a portion of the lubricating agent is caused to reside within a portion of the total thickness of the fabric element in the form of one or more clusters. This treatment is optionally performed in accordance with a further embodiment of the present invention so as to affect an imbalanced concentration of internal lubricating agent across at least a portion of the total thickness of the fabric element, with a greater concentration of such agent proximal the power transmitting surface of the belt. This allows for an effective amount of a material, e.g., an adhesive treatment in the case of non-castable elastomer belt body portions, or the liquid castable elastomer itself in the case of castable elastomer belt body portions, which is optionally applied to at least a second surface of the fabric element, and optionally in a subsequent step, to readily contact the surface of and/or penetrate at least a portion of the total thickness of the fabric, and to enter into and remain within one or more voids and interstitial spaces between the fabric's yarns and/or fibers, generally unaffected by the presence of lubricating agent within the fabric element.

For example, it has been found that the formation of one or more clusters 30 as described above has been accomplished in accordance with an embodiment of the present invention by applying to a 2×2 stretchable nylon twill fabric as described above and in the examples below an emulsion in water of PTFE having an average particle size of about 5 µm in the substantial absence of a binder. In a subsequent step the water is allowed or caused to liberate from the fabric element. It is presently believed that by essentially eliminating the binder from the composition containing the lubricating agent in accordance with this particular embodiment, clusters of the lubricating agent are urged to form as a result of the prevailing thermal dynamics within the so-treated fabric, which favor cluster formation over attraction to either the nylon (or other fiber type) in the fabric element or to the belt body elastomer.

Any suitable method for depositing internal lubricating agent within the total thickness of a fabric element may be employed in the practice of the present invention, such as conventional dipping, roll-coating, knife-coating, calendering, and spraying techniques. In accordance with conventional dipping techniques the lubricating agent flows into the fabric element from both exposed surfaces as the fabric is immersed into and lead through a dipping tank as is well known in the art, thereby penetrating at least a portion of the fabric's total thickness in an amount based generally but not exclusively on the relative particle size of the mixture's constituents and the fabric's porosity, e.g., the dimensions of the voids and interstitial spaces within the fabric element formed between individual yarns and/or fibers thereof.

It has moreover been found that in treating a fabric exemplified by the particular 2×2 twill- or matte-woven fabric described above and in further detail below in the accompanying examples by feeding the fabric optionally under an applied tension as is known in the art through a dipping tank containing the relevant lubricating agent, and about one or more sets of squeeze rollers as conventionally employed within such tanks to extend the path of the fabric and thereby its duration within the tank, one forces that surface of the fabric adjacent the rollers to compress and thereby decrease its porosity as the fabric passes through the roller; and the yarns and fibers on the opposite surface of the fabric to conversely expand and thereby generally increase their relative porosity. One of ordinary skill in the relevant art would readily recognize that where, e.g., one or more such rollers are utilized within a dipping tank and the configuration of the fabric through the feeding process arranged such that one surface of the fabric would be urged to compress for a longer period and/or for a greater number of times than the other, then the penetration of the lubricant-containing mixture within the fabric could thereby be further controlled to create the uneven or imbalanced penetration of internal lubricating agent within the fabric as described above.

Alternatively, through the utilization of conventional roll-coating or knife-coating techniques one may limit the application of the internal lubricating-agent-containing mixture to only a single surface of the fabric element and thereby achieve the concentration gradient of internal lubricating agent in the fabric element in accordance with an embodiment of the present invention. One of ordinary skill in the relevant art would readily appreciate that a rheology modifier could in such case optionally be employed in the mixture as needed as described above, to control the level of penetration of the mixture for a given fabric construction, and thereby of the internal lubricating agent itself, to a certain depth of the fabric, e.g., to from one half to three quarters of the total fabric thickness.

Irrespective of the manner in which the internal lubricating agent is applied to the fabric element, the pick-up rate of such internal lubricating agent in the fabric element in accordance with an embodiment of the present invention may be at any desired level based on the dry fabric weight; or may be in the range of from about 5% to about 50% thereof; or in the range of from about 12% to about 40% thereof; or in the range of from about 15% to about 35% thereof.

As an optional additional step, which may be beneficial for example in the construction of power transmission belts having non-castable elastomer belt body portions, an adhesive system may be applied to at least, but beneficially only the surface of the fabric element intended to be proximal the underlying belt body elastomer portions of the belt. This application provides adhesion between the fabric layer and the underlying belt elastomer and is moreover believed to contribute to the formation of a barrier or boundary between the fabric element and internal lubricating agent on one hand, and the underlying elastomeric belt body portions on the other. Application of the optional adhesive system may be by any suitable method, including spraying, knife-coating, immersion etc. In one embodiment of the present invention pertaining to the aforementioned particular 2×2 stretchable nylon twill or matte fabric, application of this material may be at any suitable pick-up rate amount based on the dry fabric weight; or may be in the range of from about 5% to about 150% thereof; or in the range of from about 12% to about 75% thereof; or in the range of from about 15% to about 50% thereof.

As a further optional step, an outer layer 38, optionally comprising a second lubricating agent, is applied to at least, but beneficially only that first surface 32 of the fabric element 22 intended to be proximal the power transmitting surface 24 of the belt. The material(s) utilized in this layer may be selected as is known in the art to contribute one or more beneficial performance characteristics such as additional wear resistance, dimensional stability and decreased noise characteristics to the composite belt structure. One of ordinary skill in the relevant art would readily recognize that such outer layer 38 could optionally be utilized in toothed belt constructions employing non-castable elastomer belt body portions, but would generally be required in constructions employing castable elastomer belt body portions in order to facilitate formation of the relevant tooth profile in the fabric element prior to it's introduction into a shape-forming mold for the liquid elastomer in accordance with conventional techniques. Moreover with regard to this embodiment of the present invention, since the internal lubricating agent within the fabric element is generally relatively mobile, this outer layer additionally serves as a barrier to prevent excessive amounts of such internal lubricating agent from dispersing too quickly or being expelled from the fabric element with use of the belt.

Any conventional and/or suitable material may be employed as the optional outer layer, including conventional rubber skim coat or upcoat compositions as are well known in the art; a thermoset or thermoplastic resin or plastic composition, and/or a blend of any two or more of the foregoing, provided that the material is generally compatible with the balance of the belt constituent members and is suitable for the intended application. Examples of such outer layer compositions and methods for applying same are set forth for example in U.S. Pat. Nos. 3,964,328, 6,419,775 and 6,296,588, the contents of which with respect to same are hereby incorporated herein by reference.

When utilized within or upon the composition for use as the outer layer, a second lubricating agent may be the same as or different from the material employed as the internal lubricating agent noted above. Application of this material may be by any suitable method including laminating, calendering, dipping, spraying and roller-coating or knife-coating; and may be so applied at any suitable pick-up rate amount based on the dry fabric weight; or may be in the range of from about 5% to about 150% thereof; or in the range of from about 12% to about 75% thereof; or in the range of from about 15% to about 50% thereof.

As one skilled in the relevant art would readily appreciate, the fabric element should generally be allowed to dry between each of the successive treatment material applications noted above. This is particularly the case with regard to the application of the internal lubricating agent to the fabric element surface, where, in accordance with a particular embodiment, at least an appreciable amount of the carrier is allowed or caused to liberate from the fabric element subsequent to application of the internal lubricating agent to the fabric element, for example to facilitate penetration into the fabric element of subsequent treatments.

Any suitable and/or conventional method may be employed in performing the balance of the steps required to build the power transmission belts of the present invention. For example, where non-castable belt elastomers are utilized, i.e., millable gum rubbers, either with or without fiber loading, the remaining belt building steps may include those of positioning the treated fabric cover element as described above within an appropriately configured mold cavity having notch portions for the formation of teeth, or upon a suitably configured belt-building drum or mandrel; disposing a tensile member against the second surface of the fabric cover element, such as by helically winding one or more tensile cords about the fabric; disposing elastomeric material against the tensile member; disposing additional alternating arrangements of tensile members and/or elastomeric material against this tensile member as required of a given construction; applying sufficient time, temperature, and/or pressure to cure or vulcanize the elastomer materials; and removing the assembly from the mold cavity or mandrel.

Where castable belt body portions are utilized in toothed belt manufacture, the production steps may furthermore include wrapping the internal-lubricating agent-bearing wear-resistant fabric about the surface of a notched mold portion in a manner such that the first surface of the fabric cover element is adjacent the notched mold portion; applying a tensile layer about the wear-resistant fabric such as by helically winding one or more tensile cords about the fabric; introducing a substantially liquid elastomeric material into the mold cavity; and polymerizing the thus formed product through application of sufficient time, temperature, and/or pressure. The penetration of the castable elastomeric material into the fabric cover element 22, entering the fabric from the second surface 34 and then moving through the fabric towards the first surface 32, tends to preserve or possibly enhance the aforementioned concentration gradient of internal lubricating agent within the fabric. The tooth portions of such belts may moreover have any suitable shape, including curvilinear, trapezoidal, etc.

Wear and the dimensional changes accompanying wear are primary sources of belt slip noise and impact noise and premature failure in endless toothed belts. In order to illustrate improved frictional properties, dimensional stability and wear characteristics provided through embodiments of the present invention, several belts were constructed as described below in Table 1, and the coefficient of friction of the relevant surface and the wear characteristics of the samples under both pure friction and increased tension conditions were ascertained.

For each of the examples and comparative examples and except to the extent described otherwise in Table 1, substantially identical belts were generally constructed according to the description provided above for FIG. 1. The belts were each constructed to be 15 mm wide and to have ninety-seven longitudinally spaced teeth of equivalent dimensions, with a 9.525-mm pitch. The belt overcord section and tooth portions in each case comprised the same conventional, sulfur cured, carbon-black filled HNBR elastomer composition, and the tensile member in each case comprised the same conventional helically configured adhesive treated glass cord. The fabric element for each of Comparative Belts 1 and 2 and Belts A and B comprised a scoured and heat-set nylon 6/6 fabric in a 2×2-twill weave, having a density of approximately 365 g/m², a thickness of about 1.07 mm, a yarn construction of 235/1 dtex (210/1 denier) in the warp and 78/6 dtex (70/6 denier) in the weft, a yarn count of about 75/25 mm in the warp and about 70/25 mm in the weft, and wherein the weft yarn was false twist (i.e., "Z"-twist) texturized.

In each case, the fabric element was treated with the relevant lubricating agent(s), adhesive- and/or upcoat treatment as further described below and in Table 1 prior to application thereof to the underlying belt body portion, subsequent to which the assemblies were in each case cured on a mandrel under elevated temperature and/or pressure conditions in accordance with conventional techniques. The order of treatment applications followed in the construction of the examples and comparative examples set forth below, e.g., of the internal lubricating agent-containing mixture, adhesive treatment and rubber upcoat and/or external lubricating agent is for purposes of illustration only and is not necessarily the only order that could be followed in the practice of the present invention, which is to be limited only as set forth in the appended claims.

To form the emulsion containing the internal lubricating agent for both Belt A and Belt B, 20.9% by weight of deionized water was first introduced to a vessel. Thereafter, 7.0% by weight of a rheology-modifying agent available from Rohm and Haas Company under the reference ACUSOL RM825, as an optional constituent, was added with agitation to the vessel. Into a second container 34.9% by weight of a 21.5% solids dispersion in water of PTFE having an average particle size of about 5 μm available from Micro Powders, Inc. under the reference MICROSPERSION HT was introduced. To this second container, 37.2% by weight of deionized water was then added with mild agitation. This combination was mixed at relatively high speed for approximately fifteen minutes, after which the rheology-modified water from the first container was slowly added to the second container under high agitation. The resultant emulsion was mixed continuously for an additional fifteen minutes and then permitted to stand for at least one hour prior to use.

For Comparative Belt 2, the internal lubricating agent utilized was PTFE having an average particle size of 225 nm. The lubricating agent was applied in a dispersion of 50-60% PTFE in water, obtained from Dyneon LLC under the reference DYNEON TF-X-5060.

For each of Comparative Belt 2 and Belts A and -B, the internal lubricating agent was first applied to the fabric element in a dipping process whereby the fabric element was fed through a dip tank under a let-off tension in the range of from about eight to ten pounds per square inch (psi), a line speed in the range of from five to eight feet per minute (ft/min), and at a wind-up tension in the range of from about 10 to about 20 psi. In the tank, the fabric was trained through three squeeze rollers as described above, having a gap setting of 0.032 inches and under an applied pressure of about 40 psi, with that surface of the fabric displaying a twill pattern in the Z direction (hereafter, "Z-twill surface") being urged to compress about two rollers and expand about one, and the opposite surface of the fabric (hereafter "S-twill surface") to compress about only one roller and expand about two of the rollers in order to create an imbalanced penetration of internal lubricating agent within the fabric element as described above. The Z-twill surface of the fabric would eventually face or be proximal the power transmitting surface of the belt, to form in each case a fabric element having a higher concentration of internal lubricating agent at the Z-twill surface than at the S-twill surface thereof, and wherein the majority of the internal lubricating agent contained within the fabric element was in each case generally limited to about 75% of the total thickness of the fabric element extending inward from the Z-twill surface thereof.

It should be understood that the use of an optional rheology modifier will depend on the particular process and equipment chosen for applying the internal lubricating agent to the fabric. For a dipping process as used above, dip viscosity is not critical and the rheology modifier is optional. For a coating process wherein it is desired to concentrate the internal lubricating agent near one surface of the fabric by treating only one surface, it is critical to control the rheology of the treating solution in order to obtain an advantageous limited penetration of solution into the fabric. For example, for a knife coating process it is advantageous to adjust the solution viscosity to somewhere in the range of from about 3000 to about 10,000 cp (centipoise), or alternately from about 4000 to about 8000 cp, using a shear-thinning rheology modifier with a rapid viscosity-recovery time after removal of shear. Once it emerged from the dipping solution, the fabric was in each case lead through a drying oven where it was exposed to one or more elevated temperature zones sufficient to drive off at least a substantial amount of the water carrier from the fabric. It is believed that the residual moisture content of the so-dried treated fabric did not exceed about 3% by weight of the treated fabric, since the hydrophilicity of the nylon utilized would generally result in some moisture retention even after substantial oven drying.

For each of Comparative Belt 2 and Belt A, the target pick-up of the internal lubricating agent upon and/or within the fabric element was 60 g/m² based on the dry weight of the so-treated fabric; and for Belt B the target pick-up level of the internal lubricating agent upon and/or within the fabric element was 136 g/m² based on the dry weight of the so-treated fabric.

For the single belt construction lacking an internal lubricating agent, i.e., Comparative Belt 1, the first treatment applied to the fabric element was a conventional HNBR-based isocyanate-containing adhesive cement, for providing adhesion between the fabric element and the underlying belt body portions. The adhesive treatment was applied to the fabric element for this specimen in a conventional dipping process whereby greige fabric was lead under controlled tension through a dip tank as described above containing the adhesive treatment and then through a set of squeeze rollers having a gap setting to provide the properly controlled solids pickup value. Target pick-up level of this adhesive treatment was 120 g/m² based on the dry weight of the so-treated fabric.

For each of Comparative Belt 2 and Belt A, this same HNBR-based isocyanate-containing adhesive cement was applied in a second treatment step (i.e., subsequent to the application of the internal lubricating agent) in the same manner and with the same target pick-up level as set forth above in relation to Comparative Belt 1.

In place of the sulfur-curable HNBR rubber adhesive cement dip treatment that was utilized in each of Comparative Belts 1 and 2 and Belt A, and in accordance with a further embodiment of the present invention, Belt B included in addition to the internal lubricating agent a second, external lubricant-containing coating applied in this instance through knife-coating of that surface of the fabric element that would eventually form or be proximal the power transmitting surface of the belt, at a dry pick-up level on the so-treated fabric of 116 g/m². The external lubricant utilized in this case was a mixture of molybdenum disulfide and PTFE, which was applied to the relevant fabric element surface in the form of a water-based mixture in resin available from Acheson Colloids Company of Port Huron, Mich. under the reference TA-014. This coating's viscosity was adjusted, by adding a rheology modifier, to a level of approximately 6000 cp at room temperature for processing control of coating penetration into fabric. The coating was a flexible thermoset formula with curing reaction activated at above 150° C. and moreover provided an optional but beneficial barrier between the fabric element and the power transmitting surface of the belt to prevent relatively mobile internal lubricating agent within the fabric element from "powdering out", i.e., from being prematurely dispersed out of the belt composite structure with prolonged use of the belt.

For each of Comparative Belts 1 and 2 and Belts A and B, a conventional solvent-based, sulfur-curable HNBR cement upcoat, or adhesion layer, was applied to the fabric element in a subsequent step for providing an adhesion or cushion layer of rubber having a predetermined gauge at the fabric surface proximal to the belt body as is generally well known. This upcoat layer was applied to the fabric cover element in each case in a conventional dipping process as described above to achieve a dry pick-up level on the so-treated fabric of 300 g/m².

The various fabric element treatments for each of the belt specimens illustrating embodiments of the present invention and of the comparative belt specimens described above are summarized below in Table 1.

TABLE 1

Belt Fabric Element Treatments

| | Comparative Belt 1 | Comparative Belt 2 | Belt A | Belt B |
|---|---|---|---|---|
| Internal Lubricating Agent Average Particle Size | N/A | 0.225 μm | 5 μm | 5 μm |
| Internal Lubricating Agent pick-up (g/m²) | 0 | 60 | 60 | 136 |

TABLE 1-continued

Belt Fabric Element Treatments

| | Comparative Belt 1 | Comparative Belt 2 | Belt A | Belt B |
|---|---|---|---|---|
| HNBR Adhesive cement pick-up (g/m²) | 120 | 120 | 120 | 0 |
| External Lubricating Agent Outer Coating pick-up (g/m²) | 0 | 0 | 0 | 116 |
| HNBR upcoat layer pick-up (g/m²) | 300 | 300 | 300 | 300 |

The coefficient of friction (COF) of each of the treated fabric elements was determined and friction-induced wear analysis (Friction wear) was conducted in each case in accordance with ASTM D3702 utilizing a FALEX apparatus at 100° C., a speed of 4.0 cm/s, a pressure of 3.4 MPa (500 psi) for a test period of 9 hours, and the results are provided below in Table 2. In each case, belt specimens were weighed before and after the test period to determine Friction wear as reported below in milligrams of material lost.

Figure 6:
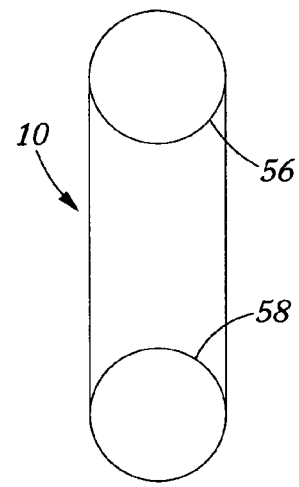
FIG. 6 is a schematic representation of a high tension wear resistance analysis apparatus utilized to illustrate a feature of an embodiment of the present invention.

An additional wear analysis (Tension wear) was moreover performed in each case to determine wear characteristics under elevated temperature and tension conditions. This wear analysis was conducted in each case utilizing the test apparatus shown schematically in FIG. 6. The apparatus consisted of a driver pulley 56 and a driven pulley 58, with each pulley having nineteen grooves and a RU profile. The belts were operated at a speed of 6360 RPM as measured on the driven pulley 58, at a tension between the pulleys of 525 N, with a belt pitch of 0.375 inches (9.525 mm). The test was conducted at 140° C. For the comparison, the belts were first weighed, then mounted on the test apparatus and re-weighed after each relevant time period reported in Table 2 below (±10 hours) to compare weight loss among the various constructions. With the exception of the result reported for Belt A at 350 hours, for which the result is that obtained for a single belt tested, the results reported for each of the Tension Wear tests were the average of at least two belts tested at the end of each of the relevant time periods.

TABLE 2

| | Comparative Belt 1 | Comparative Belt 2 | Belt A | Belt B |
|---|---|---|---|---|
| COF | 0.29 | 0.21 | 0.19 | 0.14 |
| Friction Wear (mg) | 8.80 | 2.27 | 1.73 | 1.40 |
| Tension wear @ 24 hrs (g) | 0.32 | 0.54 | 0.28 | 0.30 |
| Tension wear @ 100 hrs (g) | 1.2 | 1.79 (@ 80 hrs) | (no reading taken) | 0.30 |
| Tension wear @ 140 hrs (g) | 1.9* | 7.8* | 0.60 | (no reading taken) |
| Tension wear @ 200 hrs (g) | — | — | 1.15 | 0.5 |
| Tension wear @ 270 hrs (g) | — | — | 3.10* | 0.5 |
| Tension wear @ 350 hrs (g) | — | — | 4.13* | 0.6 (@ 386 hrs.) |
| Tension wear @ 820 hrs (g) | — | — | — | 1.6 |
| Tension wear @ 880 hrs (g) | — | — | — | 3.6* |

*denotes point of failure of at least one of belts tested at relevant number of hours on test.

Comparing the results obtained for Comparative Belt 1, comprising neither an internal nor an external lubricating agent, with those of Comparative Belt 2, employing an internal lubricating agent having an average particle size of only about 0.225 micrometers, one readily observes that while as expected the former specimen exhibits a generally higher COF and dramatically increased frictional wear compared to the latter, the wear results under the increased temperature and tension tests are in fact reversed, with the lubricant-containing Comparative Belt 2 exhibiting increased wear under high tension compared to the lubricant-free Comparative Belt 1.

It is presently believed that this is at least in part due to the greater impact of subsequently applied fabric treatments on the small particle size agents. In particular, it is believed that such small particle size materials exhibit a dominant tendency to become dispersed in a generally homogenous manner throughout adhesive or outer rubber treatments or, in the case of urethane belts in the liquid urethane elastomer portion itself, as such additional materials are applied in generally liquid form to the fabric, rather than to form one or more highly concentrated and relatively mobile clusters within the fabric itself. It is believed that due to the ready dispersion of such agents into these treatments, an appreciable amount of lubricating agent becomes dispersed throughout that portion of the fabric element including the surface thereof facing the underlying belt elastomer, with concomitant negative impact on adhesion at this interface, and an increase in wear under high tension conditions.

Comparing the results obtained for Belt A of the present invention with those of Comparative Belt 2, one observes that while the specimens exhibited-roughly comparable COF due to both specimens employing PTFE as the internal lubricating agent and no additional lubricating agent in the power transmitting surface outer layer, and moreover exhibited roughly comparablepure friction (Falex) wear, the specimens nonetheless exhibited dramatically different high tension wear resistance, with the latter showing quickly accelerated deterioration and exhibiting failure due to land portion wear after only 140 hours on test. Belt A conversely exhibited consistently low wear for over 300 hours on test (i.e., more than twice the life on test exhibited by Comparative Belt 2), and exhibited over-all 50% less wear over its life as manifested in weight loss compared to that comparative example. As noted above, it is believed that this distinction is attributable to the creation in Belt A of beneficial internal lubricating agent clusters 36 within the total thickness of the fabric element 22 as illustrated in FIG. 4, and the absence of such clusters in Comparative Belt 2 as illustrated in the treated fabric element 23 shown FIG. 5.

Figure 4:
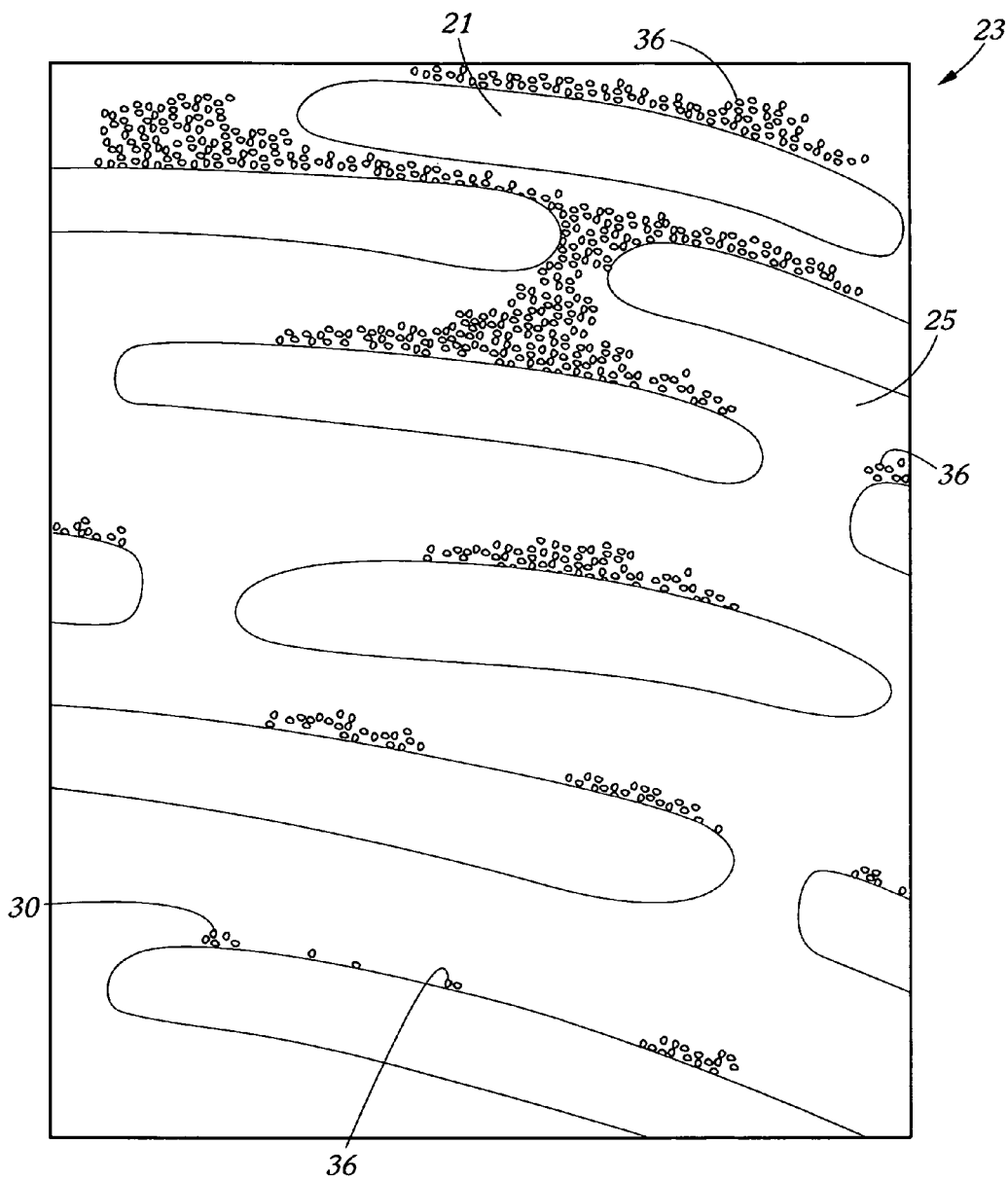
FIG. 4 is a representation of an image obtained by Scanning Electron Microscopy of lubricating agent clusters within a portion of a fabric element in accordance with an embodiment of the present invention.
Figure 5:
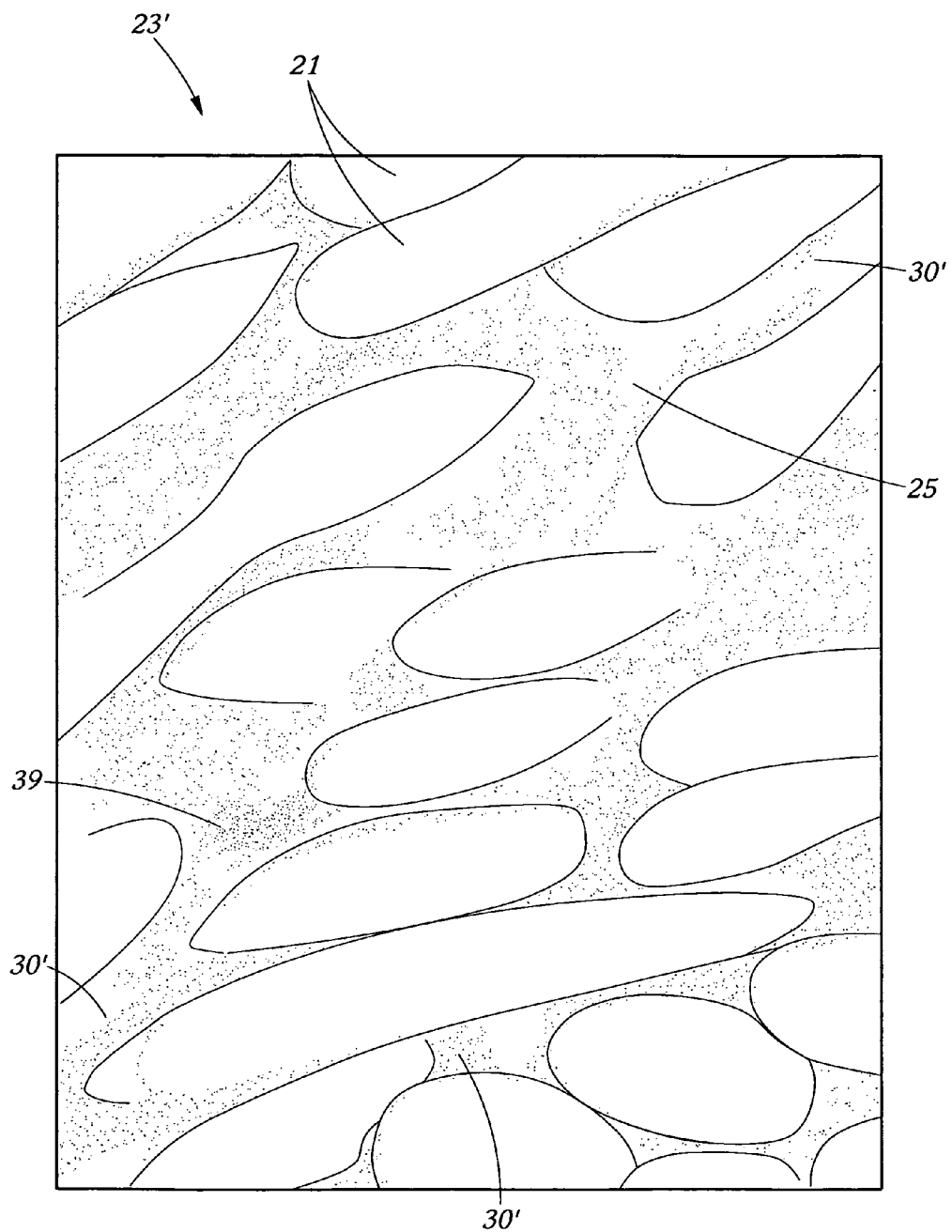
FIG. 5 is a representation of an image obtained by Scanning Electron Microscopy of lubricating agent within a fabric element in a comparative specimen.

The formation of clusters 36 of internal lubricating agent as utilized in Belt A is illustrated in FIG. 4, which is based on an image obtained through Scanning Electron Microscopy at a magnification level of five hundred times, of a cross-section of a treated fabric element 23 shown generally, constructed in accordance with the description of Belt A above, including both an internal lubricating agent 30 having an average particle size of 5 μm, which appears in FIG. 4 as irregularly shaped individual or grouped globules or clusters 36 having white outlines; and a subsequently-applied HNBR adhesive cement 25, which appears in FIG. 5 as the continuous black region between fibers 25 and having no distinct morphology. The lubricating agent 30 and the cement 25 utilized in the treated fabric element 23 shown in FIG. 4 were of the particular types described above for Belt A, and were applied to the fabric in the same amounts and substantially in the same manner as utilized for Belt A. One may observe that relatively large highly concentrated clusters 36 of lubricating agent 30 have formed throughout the substantially continuous phase formed by the cement 25 in the fabric interstices formed by the spaces between fabric yarns 21. Subsequent further magnification and examination of representative clusters revealed that such clusters 36 are characterized by PTFE lubricating agent particles that are relatively loosely grouped together with very little or no cement between adjacent particles.

The failure of the internal lubricating agent utilized in Comparative Belt 2 to form clusters is illustrated in FIG. 5, which is based on an image obtained through Scanning Electron Microscopy at a magnification level of five hundred times, of a cross-section of a treated fabric element 23' shown generally, constructed in accordance with the description of Comparative Belt 2 above, including both an internal lubricating agent 30' having an average particle size of 0.225 μm and appearing in FIG. 5 as generally individual white points dispersed throughout the dark mass present between individual fibers 21; and a subsequently-applied HNBR adhesive cement 25, appearing in FIG. 5 as that mass present between individual fibers. The lubricating agent 30' and the cement 25 utilized in the treated fabric element 23' shown in FIG. 5 were of the particular types described above for Comparative Belt 2, and were applied to the fabric in the same amounts and substantially in the same manner as utilized for Comparative Belt 2. One may readily observe that in contrast to the FIG. 4 example, the lubricating agent 30' is generally dispersed homogeneously throughout the cement treatment 25 in the interstices between individual fibers 21, with substantially no highly concentrated areas or domains of the lubricating agent itself. Notably, the penetration of the cement 25 into the spaces between individual fibers 21 is substantially complete. Subsequent further magnification and examination of a region of somewhat higher lubricating agent concentration as shown for example at 39 in FIG. 5 revealed that such regions are characterized by PTFE lubricating agent particles that are in generally close proximity to one another but are nonetheless essentially each surrounded by the continuous phase formed by the HNBR adhesive cement 25. It is presently believed that these internal lubricating agent particles 30' initially disperse throughout these fabric treatments while such treatments are generally in a liquid phase, and then become essentially trapped with hardening of such treatments, i.e., they cannot generally move within the fabric structure to provide their lubricating, wear-reducing function between fabric yarns or fibers and/or to replenish the wear-dependent surface of the belt.

While not intending to be bound to any one particular theory, it is presently believed that the formation of highly concentrated lubricating agent clusters as found for example in the Belt A examples is caused by a combination of thermodynamic- and mechanical factors that favor such cluster formation over dispersion of the lubricating agent throughout subsequently applied fabric treatments, as conversely obtained for example in Comparative Belt 2. Mechanical factors that may bear on whether cluster formation is favored are believed to include for example relative lubricating agent particle size and the corresponding fabric's porosity. Thermodynamic factors may be determined for example by the relative polarity and/or surface energy of the lubricating agent type, e.g., PTFE versus molybdenum disulfide; the subsequent fabric treatment, e.g., HNBR-based cement versus cast urethane; and fabric type, e.g., nylon versus cotton. As noted above, it is the presence of these clusters 36 in the fabric element 22 in accordance with an embodiment of the present invention that is believed to account for the improved wear resistance characteristics provided by the present invention, particularly but not exclusively under high tension conditions.

One may moreover observe that Belt B of the present invention, incorporating more than twice the amount of internal lubricating agent and moreover including a second, generally external lubricating agent in its outer layer, exhibited even greater wear resistance properties than those reported for Belt A of the present invention, failing only after 900 hours on the test and exhibiting consistently low wear for over 600 hours on test.

The results of these analyses indicate that belts constructed in accordance with various embodiments of the present invention and incorporating the internal lubricating agent tending to form one or more clusters within at least a portion of the total thickness of the fabric element exhibit substantially improved dimensional stability and wear resistant characteristics, particularly under high tension conditions, compared to belts having no internal lubricating agent, as well as compared to those belts employing the same type of internal lubricating agent but lacking this cluster-forming characteristic. The belts of the present invention are thus likely to enjoy substantially longer operating life under high load and/or high-speed conditions. It is presently believed that the belts of the present invention would be able to tolerate significantly higher tension in use compared to known belt constructions and/or could tolerate equivalent loads utilizing a narrower belt, due to the inventive belts' improved wear-resistance performance capabilities, as well as their excellent mechanical characteristics.

While the examples and comparative examples provided herein illustrate features of the subject invention in one embodiment utilizing two specific fabric constructions, each incorporating the same thickness and density; and with reference to internal lubricating agent exhibiting an average particle size of either 225 nm or 5 µm, the present invention is not so limited. One of ordinary skill in the art would readily appreciate from the context of this disclosure that both fabric construction (e.g., porosity, thickness, density) and internal lubricating agent type and average particle size could be variously selected for example consistent with the subject teachings in order to provide a combination resulting in the formation of one or more lubricant-rich clusters within the fabric element itself.

Although the present invention has been described in detail for the purpose of illustration, it is to be understood that such detail is solely for that purpose and that variations can be made therein by one skilled in the art without departing from the spirit or scope of the present invention except as it may be limited by the claims. The invention disclosed herein may suitably be practiced in the absence of any element that is not specifically disclosed herein.

What is claimed is:

1. A method for producing a power transmission belt possessing a belt length and a flexible body portion, comprising the steps of:
   a) applying to a fabric element possessing a first surface and a second, opposite surface an internal lubricating agent to form a treated fabric, and;
   b) disposing said treated fabric against a material for forming said flexible body portion; characterized in that the method further comprises the step of;
   c) causing at least a portion of said internal lubricating agent to form at least one cluster of said internal lubricating agent within at least a portion of the total thickness of the fabric; wherein said lubricating agent is applied as part of a mixture further comprising a carrier constituent in substantial absence of a binder constituent.

2. The method of claim 1 wherein said mixture further comprises a rheology-modifying agent.

3. The method of claim 2 wherein said rheology-modifying agent is added in a quantity sufficient to adjust the viscosity of said mixture to within the range of from about 3000 cp to about 10,000 cp.

4. The method of claim 1 further comprising the step of causing at least a substantial portion of the carrier constituent to liberate from said fabric element after application of said mixture to said fabric element.

5. The method of claim 1 further comprising the step of applying the internal lubricating agent so as to effect an imbalanced concentration of internal lubricating agent within the fabric element, with a higher concentration of internal lubricating agent proximal said first surface of the fabric element, and a lower concentration thereof at least a point within the total thickness of the fabric element.

6. The method of claim 5 wherein said step of applying the internal lubricating agent within the fabric element comprises at least one of
   (a) knife-coating or roll-coating said internal lubricating agent onto only one of the two surfaces thereof, and
   (b) dipping said fabric element in a vessel containing said internal lubricating agent and causing said fabric element to be drawn about at least one roller member.

7. The method of claim 1 further comprising the step of applying to at least a second surface of the fabric element an adhesive treatment comprising at least one adhesive ingredient.

8. The method of claim 1 further comprising the step performed at any point prior to application of said fabric element to said material for forming said body portion, of applying to at least said first surface of the fabric element an outer layer comprising at least one of a rubber ingredient, a resin ingredient, a plastic ingredient, and a second lubricating agent.

* * * * *